United States Patent
Mukherjee et al.

(10) Patent No.: US 12,476,871 B2
(45) Date of Patent: Nov. 18, 2025

(54) TECHNIQUES TO FACILITATE CONSUMER-DEFINED WORKLOADS FOR A NETWORK SLICE OF A SLICE PROVIDER NETWORK

(71) Applicant: Cisco Technology, Inc., San Jose, CA (US)

(72) Inventors: Arghya Mukherjee, Acton, MA (US); Viktor Mats Emanuel Leijon, San Jose, CA (US); Ian J. Wells, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/497,209

(22) Filed: Oct. 30, 2023

(65) Prior Publication Data

US 2025/0141745 A1 May 1, 2025

(51) Int. Cl.
*H04L 41/0806* (2022.01)
*H04L 41/0895* (2022.01)
*H04L 41/122* (2022.01)

(52) U.S. Cl.
CPC ...... *H04L 41/0895* (2022.05); *H04L 41/0806* (2013.01); *H04L 41/122* (2022.05)

(58) Field of Classification Search
CPC ............. H04L 41/0895; H04L 41/0806; H04L 41/122
USPC ....................................................... 709/224
See application file for complete search history.

(56) References Cited

U.S. PATENT DOCUMENTS

| 10,917,317 | B2 * | 2/2021 | Stammers | H04L 41/5054 |
| 11,882,006 | B1 * | 1/2024 | Nesteroff | H04L 41/12 |
| 2018/0077023 | A1 * | 3/2018 | Zhang | H04L 41/5003 |
| 2019/0364450 | A1 * | 11/2019 | Yao | G06F 9/45558 |
| 2020/0366567 | A1 * | 11/2020 | Li | H04L 41/5019 |
| 2021/0136162 | A1 * | 5/2021 | Young | H04L 41/0806 |

(Continued)

OTHER PUBLICATIONS

3GPP: "3rd Generation Partnership Project, Technical Specification Group Services and System Aspects, Management and Orchestration, Provisioning, (Release 18)", 3GPP TS 28.531 V18.2.0, Jun. 2023, 82 Pages.

(Continued)

*Primary Examiner* — Karen C Tang
(74) *Attorney, Agent, or Firm* — Edell, Shapiro & Finnan, LLC

(57) ABSTRACT

Provided herein are techniques to facilitate providing consumer-defined workloads for a network slice of a slice provider network. In at least one example, a method may include transmitting a query to a slice provider function for topology information of an instantiated network slice in which the instantiated network slice includes slice resources provided at a plurality of network locations. The method may further include obtaining the topology information that identifies, at least in part, the plurality of network locations at which the slice resources and identifying, based at least in part on the topology information, at least one network location of the instantiated network slice at which to instantiate a consumer-defined workload, and transmitting a request to instantiate the consumer-defined workload that includes at least one location identifier of the at least one network location and a workload identifier of the consumer-defined workload to be instantiated.

20 Claims, 6 Drawing Sheets

(56) References Cited

U.S. PATENT DOCUMENTS

| | | | |
|---|---|---|---|
| 2022/0124560 A1* | 4/2022 | Yeh | H04L 41/5025 |
| 2023/0148302 A1* | 5/2023 | Ping | H04W 24/02 |
| | | | 370/254 |
| 2023/0180017 A1* | 6/2023 | Gadalin | H04W 16/22 |
| | | | 370/328 |
| 2023/0275814 A1* | 8/2023 | Gupta | G06F 3/04847 |
| | | | 715/735 |
| 2024/0089218 A1* | 3/2024 | Huda | H04L 41/16 |

OTHER PUBLICATIONS

Badmus I., et al., "End to End Network Slice Architecture and Distribution Across 5G Micro Operator Leveraging Multi domain and Multi tenancy", EURASIP Journal on Wireless Communication and Networking, Apr. 14, 2021, pp. 1-23.

Cisco: "3 Keys to Succeeding at IoT Scale with Cellular Connectivity Management", Cisco IoT Control Center, Cisco Public, PSOSPG-1701, available at: https://www.ciscolive.com/on-demand/on-demand-details.html?#/session/1686177897106001Vgae, pp. 1-22.

ETSI: "5G, Management and Orchestration, Concepts, Use Cases and Requirements (3GPP TS 28.530 version 17.4.0 Release 17)", ETSI TS 128 530 V17.4.0, Apr. 2023, 39 Pages.

ETSI: "5G, Management and Orchestration, Provisioning (3GPP TS 28.531 version 17.8.0 Release 17)", ETSI TS 128 531 V17.8.0, Jul. 2023, 76 Pages.

ETSI: "Network Functions Virtualisation (NFV), Management and Orchestration", Group Specification, ETSI GS NFV-MAN 001 V1.1.1, Dec. 2014, pp. 1-184.

ETSI: "Network Functions Virtualisation (NFV) Release 2, Protocols and Data Models, NFV Descriptors based on TOSCA Specification", Group Specification, ETSI GS NFV-SOL 001 V2.5.1, Dec. 2018, pp. 1-205.

ETSI: "Network Functions Virtualisation (NFV) Release 3, Protocols and Data Models, NFV Descriptors based on TOSCA Specification", ETSI GS NFV-SOL 001 V3.5.1, Jul. 2021, pp. 1-404.

ETSI: "Network Functions Virtualisation (NFV) Release 4, Protocols and Data Models, NFV Descriptors based on TOSCA Specification", ETSI GS NFV-SOL 001 V4.4.1, May 2023, pp. 1-476.

GSMA: "Generic Network Slice Template", Version 7.0, GSM Association, Official Document NG.116—Generic Network Slice Template, Jun. 17, 2022, pp. 1-71.

ONAP: "ONAP E2E Network Slicing," Technical Overview, Providing End-to-end 5G Network Slicing Capability, pp. 1-10.

Rao A., "5G Network Slicing: Cross-domain Orchestration and Management Will Drive Commercialization", White paper, Research, Analysys Mason Limited, XP055961697, Sep. 2020, 22 Pages.

SDX: "What Is an NFV Orchestrator (NFVO)? Definition", SDxCentral, retrieved from https://www.sdxcentral.com/networking/nfv/definitions/whats-network-functions-virtualization-nfv/nfv-elements-overview/nfv-orchestrator-nfvo-definition/, Sep. 6, 2023, 15 Pages.

SDX: "What is Virtualized Infrastructure Manager (VIM)? Definition", SDX Central, retrieved from https://www.sdxcentral.com/networking/nfv/definitions/whats-network-functions-virtualization-nfv/nfv-elements-overview/virtualized-infrastructure-manager-vim-definition/, Sep. 6, 2023, 16 Pages.

TMFORUM: "Service Ordering Management API User Guide", Version 4.1.0, TM Forum Specification, TMF641, Team Approved Date Dec. 7, 2020, pp. 1-66.

* cited by examiner

| LOCATION REF 128-1 | PERFORMANCE CHARACTERISTICS 128-2 |
|---|---|
| LOC(A: LAT/LON, GPS, LOGICAL NAME) | NETWORK LATENCY/JITTER; COMPUTE: 128 GB RAM; NETWORK PROTOCOLS (), VNFs[SMF] |
| LOC(B: LAT/LON, GPS, LOGICAL NAME) | NETWORK LATENCY/JITTER; L2 ADJACENT TO A vLAN; vRAN ADJACENCY[RAT TYPE(s)](5G), LATENCY/JITTER]; COMPUTE: 128 GB RAM; STORAGE: 2 TB, NETWORK PROTOCOLS (), VNFs(UPF) |
| ... | ... |
| LOC(Z: LAT/LON, TAI, LOGICAL NAME) | NETWORK LATENCY/JITTER, vRAN ADJACENCY[RAT TYPE(s)](5G), LATENCY/JITTER]; COMPUTE: 64 GB RAM; STORAGE: 1 TB, NETWORK PROTOCOLS (), VNFs(UPF) |

TOPOLOGY INFORMATION 128

FIG.1B

TECHNIQUES TO FACILITATE CONSUMER-DEFINED WORKLOADS FOR A NETWORK SLICE OF A SLICE PROVIDER NETWORK

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. With the introduction of mobile network slicing architectures, new opportunities have been created for improving communications and services that can be offered to both wireless providers and wireless devices that utilize mobile communication networks.

BRIEF DESCRIPTION OF THE DRAWINGS

FIG. 1B is a diagram illustrating example details for topology information that may be provided by a slice provider network to a slice consumer network, according to an example embodiment.

DETAILED DESCRIPTION

Overview

Figure 1A:
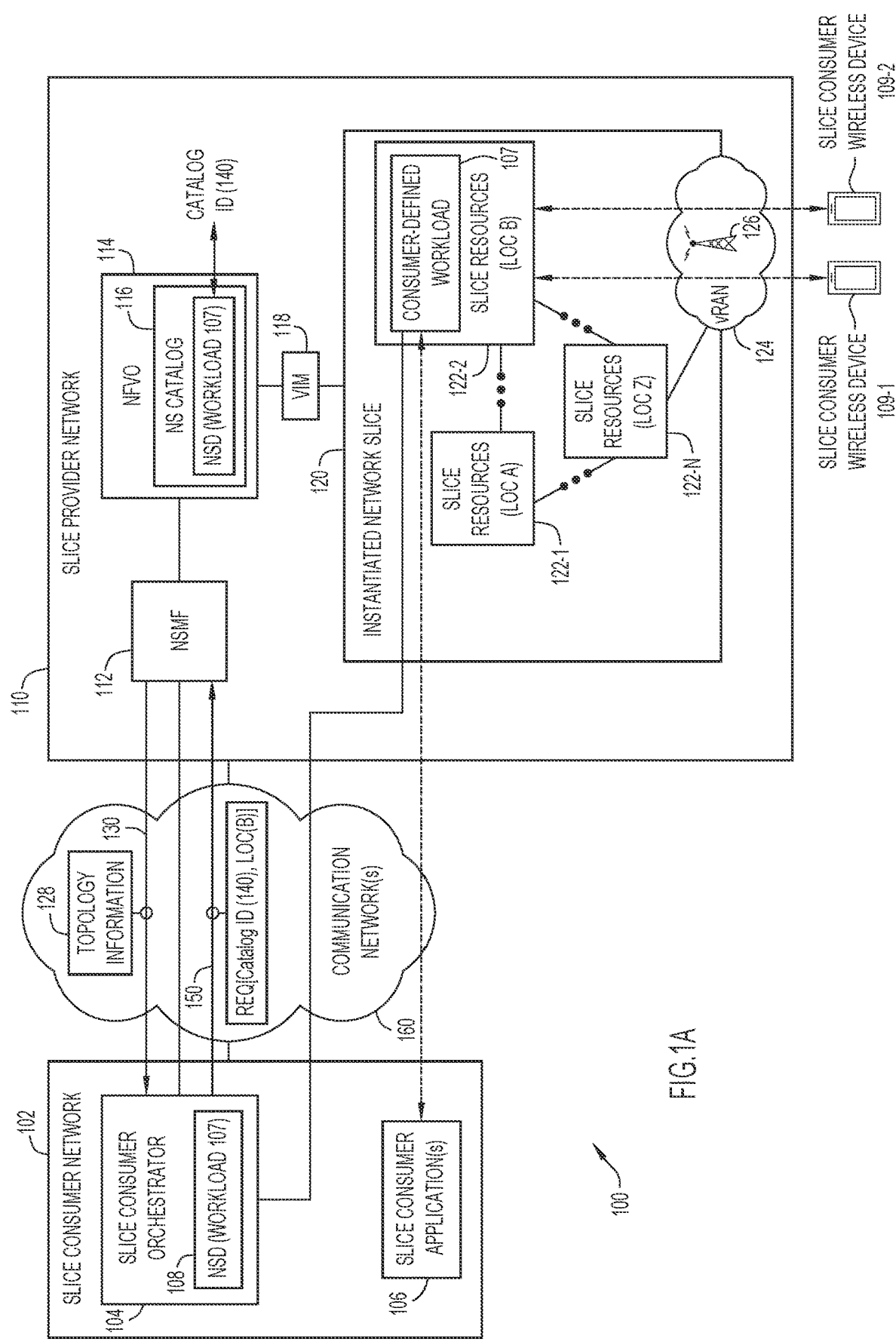
FIG. 1A illustrates a system in which consumer-defined workloads may be provided within a network slice of a slice provider network, according to an example embodiment.

Provided herein are techniques that may allow slice network providers, such as Fifth Generation (5G) network slice providers, to offer true cloud infrastructure-like services to slice consumers by enabling slice consumers to run/operate consumer-defined workloads (i.e., as specified/customized/defined by slice consumers) in one or more network locations as specified by the slice consumers, within the context of instantiated network slices provided by slice network providers. Such techniques may allow a slice consumer to cater to the criteria of their own network elements (e.g., Internet of Things (IoT) controllers, Domain Name System (DNS) servers, custom content caches, etc.) by utilizing resources within a network slice provided by a slice provider network and may provide revenue potential for slice providers.

In at least one embodiment, a computer-implemented method is provided that may include transmitting a query to a slice provider function for topology information of an instantiated network slice that is operated by a network slice provider, wherein the instantiated network slice comprises slice resources provided at various network locations of the instantiated network slice; obtaining the topology information from the slice provider function, wherein the topology information identifies, at least in part, the plurality of network locations at which the slice resources are provided for the instantiated network slice; identifying, based at least in part on the topology information, at least one network location of the instantiated network slice at which to instantiate a consumer-defined workload for the instantiated network slice; and transmitting a request to the slice provider function to instantiate the consumer-defined workload at the at least one network location of the instantiated network slice, wherein the request comprises at least one location identifier of the at least one network location of the instantiated network slice and a workload identifier of the consumer-defined workload that is to be instantiated at the at least one network location of the instantiated network slice.

EXAMPLE EMBODIMENTS

Network slicing is a concept that has been introduced for Third Generation Partnership Project (3GPP) mobile core network architectures. A network slice is a logical end-to-end network, often instantiated via a combination of slice resources, such as virtualized network functions (VNFs), in which the network slice can be dynamically created (instantiated) and may include any combination of 3GPP mobile core network functions/functionality. Thus, a network slice can generally refer to a group or set of slice resources that are configured and instantiated in order to facilitate mobile network services. As referred to herein, a mobile core network can be referred to interchangeably as a mobile network.

In 3GPP mobile network environments, such as for Fifth Generation (5G) network environments involving networking slicing, a slice consumer (e.g., an enterprise entity, etc.) can order (e.g., via a slice consumer orchestrator) orders and manage a slice that may be provided/instantiated by a slice provider (e.g., a mobile network operator (MNO)) through a Network Slice Management Function (NSMF) provided by the slice provider. The ordered slice can be characterized as an abstraction of slice resources and a virtual radio network that is dedicated to the needs/use case scenarios of the slice consumer.

However, the current 5G slicing system and the application programming interfaces (APIs) provided by 3GPP standards, among others, do not envision or support mechanisms for a slice consumer to run or operate its own, consumer-defined workloads/functions/logic/agents within a network slice that is tailored to meet the aims and objectives of the applications or services for which the slice consumer may seek to utilize the network slice. There may be many scenarios in which a slice consumer may desire to install/operate their own agents/workloads within a slice in order to perform tasks/operations that may provide services, capabilities, features, etc. that could be utilized by the specific population of consumer user devices that may utilize the slice (e.g., wireless user devices that connect to/utilize the slice).

For example, a slice consumer may desire to implement Internet of Things (IoT) controllers that may operate/execute specific IoT devices and/or applications developed/deployed by a slice consumer, content caches, and so on, which may be critically dependent to the proximity to a specific slice component/slice resource and/or a consumer device seeking to utilize such a consumer-defined workload. As a specific instance, a particular slice consumer may want to provide a customized Domain Name System (DNS) service in close proximity (e.g., within a same cluster) to all or some instances of 5G User Plane Functions (UPFs) of an instantiated network slice provided by a slice provider.

Current network slicing mechanisms are limited to bringing-up or instantiating a 'canned' or predefined/non-customizable instance of a network slice, with all workloads of the slice instance being supplied by the slice provider or a vendor of the slice provider.

However, it would be advantageous to provide a slice consumer with the ability to cause consumer-defined workload(s) at particular location(s)/slice resource(s) of an instantiated slice that is provided by a slice provider. Providing such an ability to facilitate consumer-defined workload(s) at particular location(s)/slice resource(s) may have the potential unlock strong revenue potential to service/slice providers and, thus, may be considered critical to address for slicing architectures.

In accordance with embodiments herein, techniques are provided that may enable slice consumers to have a more complete set of controls over consumer-defined workloads that are to be provided in an instantiated network slice that is operated by a slice provider/via a slice provider network. Based on topology information of the instantiated network slice that is provided to the slice consumer by the slice provider, the slice consumer can request the instantiation of a consumer-defined workload at a particular location via slice resources provided by the instantiated network slice at the particular location. In at least one embodiment, the instantiated consumer-defined workload may serve applications that the slice consumer seeks to operate over the instantiated network slice.

Referring to FIG. 1A, FIG. 1A illustrates a system 100 in which consumer-defined workloads may be provided within a network slice of a slice provider network, according to an example embodiment. In at least one embodiment, system 100 may include a slice consumer network 102 operated by a slice consumer that interfaces with a slice provider network 110 operated by a slice provider via one or more communication networks 160. Also shown in FIG. 1A are a number of slice consumer wireless devices, shown in FIG. 1A as a slice consumer wireless device 109-1 and a slice consumer wireless device 109-2 that may be considered as user devices, user equipment (UE), IoT devices, and/or any other wireless devices that are managed by or otherwise associated with the slice consumer operating slice consumer network 102.

FIG. 1B is a diagram illustrating example details for topology information 128 that may be provided by the slice provider network 110 to the slice consumer network 102 in order to facilitate various operations as discussed for embodiments herein and will be discussed with reference to FIG. 1A.

Slice consumer network 102 may include a slice consumer orchestrator 104 and one or more slice consumer applications 106. Slice provider network 110 may facilitate a network slicing architecture that may include a Network Slice Management Function (NSMF) 112, a network function virtualization orchestrator (NFVO) 114 and a Virtualized Infrastructure Manager (VIM) that may operate to provide an instantiated network slice 120, which may include any slice resources, shown in FIG. 1A as slice resources 122-1, slice resources 122-2, thru slice resources 122-N to facilitate various slice services/operations, and a virtual Radio Access Network (vRAN) 124, which may provide a wireless (Radio Frequency (RF)) coverage area via a radio node 126 through which wireless devices 109-1 and 109-2 may wirelessly connect to radio node 126/vRAN 124 in order to access services of instantiated network slice 120. It is to be understood that various slice resources may also be provided for vRAN 124, in addition to radio node 126.

In various embodiments, radio node 126 may be implemented as any combination of a Fourth Generation/Long-Term Evolution (4G)/(LTE) radio node, such as an eNodeB, a 5G radio node, such as a gNodeB, and/or a wireless local area network (WLAN) radio node (e.g., a Wi-Fi® AP). Although not shown in FIG. 1A, slice resources for vRAN 124 may provide operational capabilities of disaggregated vRAN components, such as one or more Centralized Units (CUs) and one or more Distributed Units (DUs) in which the CUS may interface with the DUs, which may further interface with radio node 126 and/or multiple radio nodes (not shown).

Generally, slice consumer network 102 may interface with slice provider network 110 via communication networks 160, which may be inclusive of any combination of a wired and/or wireless wide area network, such as the public Internet, an enterprise network, etc. that may facilitate communications between elements of slice consumer network 102 and slice provider network 110. As shown in FIG. 1A, slice consumer orchestrator 104 may interface (via communication networks 160) with NSMF 112 and, once instantiated in accordance with embodiments herein, with consumer-defined workload 107, which may also interface with slice consumer application(s) 106. NSMF 112 may further interface with NFVO 114, which may further interface with VIM 118. Generally, NSMF 112 and VIM 118 may also interface with various slice resources 122-1-122-N of instantiated network slice 120 and vRAN 124.

Regarding slice consumer network 110, slice consumer orchestrator 104 may perform operations for ordering a slice from slice provider network 110, such as instantiated network slice 120, as well as requesting one or more consumer-defined workloads to be instantiated for the instantiated network slice, such as a consumer-defined workload 107, as shown in FIG. 1A, which is discussed in further detail below. Slice consumer orchestrator 104 may also perform operations for managing, via NSMF 112, certain operational aspects of instantiated network slice 120 (e.g., changing the slice parameters, modifying the geographical scope of the slice), as well as managing certain operational aspects of consumer-defined workload 107 (e.g., starting/stopping the workload, changing configuration of the workload), once instantiated via instantiated network slice 120.

In various embodiments, slice consumer application(s) 106 may be inclusive of any applications that may be operated via slice consumer network 102, including, but not limited to, IoT control/management/communication applications, collaboration applications (e.g., video conferencing applications, etc.), streaming media applications (e.g., streaming audio and/or video), workplace productivity applications (e.g., email, content generation, scheduling, etc.), combinations thereof, and/or any other applications through which/with which slice consumer wireless devices 109-1 and/or 109-2 may operate/communicate and/or be operated, configured, controlled, etc. (as generally illustrated via the various dashed-line interactions, as shown in FIG. 1A, which may be representative of any combination of data, management, and/or control plane interactions, communications, operations, etc.).

Generally, the network slicing architecture provided by slice provider network 110 may be configured in accordance with the Network Functions Virtualization Management and Orchestration (NFV-MANO) architectural framework, as defined, for example the European Telecommunications Standards Institute (ETSI) Group Specification (GS) NFV-MAN 001, Version 1.1.1, published December 2014, ETSI GS NFV-SOL 001 Version 4.4.1, published May 2023, among other applicable ETSI standards, and 3GPP Technical Specification (TS) 28.530, Version 17.4.0, published April 2023, among other applicable 3GPP standards, with enhancements as discussed for embodiments herein that provide for the ability to facilitate the instantiation of consumer-defined workloads, such as consumer-defined workload 107, at one or more locations of one or more instantiated network slices, such as instantiated network slice 120, as requested by a slice consumer network, such as slice consumer network 102 (via slice consumer orchestrator 104).

Regarding slice provider network 110, NSMF 112 may operate to facilitate the management and orchestration of network slice instances, such as instantiated network slice 120, via NFVO 114 and VIM 118, and may be enhanced to perform additional operations as discussed for embodiments herein. The NFVO 114 may operate, via VIM 118, to facilitate the orchestration of Network Function Virtualization Infrastructure (NFVI) resources across one or more VIMs, such as VIM 118. NFVO 114 may also maintain a network service (NS) catalog 116 that provides a repository of network services that may facilitate the generation of workloads that can be instantiated via instantiated network slice 120, as may be defined by a corresponding Network Service Descriptor (NSD) that describes each workload (e.g., slice resource criteria/features, operational criteria/features, compute/storage/network resource criteria, logic, instructions, etc.). NFVO 114 may also maintain a VNF catalog (not shown) that provides a repository to support the creation and management of VNFs that may be provided via instantiated network slice 120.

NFVI may be represented generally in FIG. 1A as slice resources 122-1-122-N, which may be inclusive of any combination of virtualized and/or non-virtualized network slice resources supporting any combination of VNFs that may be wholly and/or partially virtualized, as well as any other resources that may be provided to facilitate the operation/communications involving instantiated network slice 120 and vRAN 124 (e.g., Radio Frequency (RF) communication resources provided via radio node 126, etc.). Thus, broadly, slice resources 122-1-122-N may represent any combination of compute/processing resources including hosts and/or bare metal that may include any combination of hardware processors, memory elements, etc., storage resources, and/or network resources (e.g., switching resources, routing resources, forwarding resources, subnet resources, etc.) that may be provided at one or more network locations of instantiated network slice 120, which is considered inclusive of vRAN 124.

In various embodiments, VNFs provided via slice resources 120-1-120-N may provide various 5G core network functions, such an Access and Mobility Management Function (AMFs), a Session Management Function (SMF), one or more UPFs, policy/subscriber repositories/management functions, such as a Policy Control Function (PCF), a Unified Data Management (UDM) and Unified Data Repository (UDR) element, and/or any other core network functions in addition to any specialized/customized functions/workloads that may be instantiated via slice resources 122-1-122-N of instantiated network slice 120, such as consumer-defined workload 107.

VIM 118 may be responsible for controlling and managing the compute, storage, and/or network resources of slice resources 122-1-122-N(NFVI) in addition to any other operations that may be provided by VIM 118 in accordance with embodiments herein.

During operation, system 100 may operate to facilitate the instantiation of a consumer-defined workload within an instantiated network slice, such as consumer-defined workload 107 within instantiated network slice 120 utilize various operations/interactions between slice consumer network 102 and slice provider network 110.

In various embodiments, one or more consumer-defined workloads that may be instantiated at one or more locations of an instantiated network slice, such as consumer-defined workload 107, may be inclusive of and/or translate to any function, controller, operation, etc. that is desired by slice consumer network 102 to be provided within instantiated network slice 120, such as full-fledged appliances running on bare metal, virtual machines (VMs), containers (running on servers and/or routers), serverless functions and sidecars, and/or the like, as long as the security perimeter of the instantiated network slice 120.

In accordance with embodiments herein, the consumer-defined workload 107 is brought-up (i.e., instantiated) as an additional component/service/workload of already existing/instantiated network slice 120 and would have access to the (standards-based) slice data plane, but may not have access to management or data planes of the slice provider network 110 outside of instantiated network slice 120.

Broadly during operation, the NSMF 112 may act as a clearing house for the consumer-defined workload 107 creation/onboarding process and instantiation process in which, potentially asynchronously (e.g., at a different time from when the workload is actually requested to be instantiated within instantiated network slice 120), the NSMF 112 operates in conjunction with the NFVO 114 to onboard/catalog the consumer-defined workload 107 that is to be instantiated within instantiated network slice 120 via an NSD that describes the workload 107 (e.g., NSD (workload 107)), shown in FIG. 1A as NSD 108. Thus, the NFVO 114 can be used as a generic function that can orchestrate workloads, including consumer-defined workload 107 (e.g., a controller, etc.), within instantiated network slice 120.

Generally, NSD 108 may contain/describe specifications, criteria, logic, instructions, etc. that define the operation(s), communication(s), etc. that may be performed/utilized by consumer-defined workload 107. In at least one embodiment, NSD 108 may be defined in accordance with ETSI/3GPP standards.

In order to onboard the workload 107 to the slice provider network 110, the slice consumer orchestrator 104 can communicate the NSD 108 (or similar structure) for consumer-defined workload 107 to the NSMF 112 and the NSMF 112 can onboard the NSD 108 describing consumer-defined workload 107 to the NFVO 114, which adds the NSD 108 for consumer-defined workload 107 to its NS catalog 116 with a catalog identifier (ID), shown in FIG. 1A as a catalog ID 140. The NSMF 112 returns the catalog reference (e.g., catalog ID 140) to the slice consumer orchestrator 104 to utilize when requesting the consumer-defined workload 107 to be instantiated within instantiated network slice 120.

For instantiating the consumer-defined workload 107 within the instantiated network slice 120, the slice consumer orchestrator 104 can request slice topology information 128 from the slice provider via the NSMF 112, which the NSMF 112 provides to the slice consumer orchestrator 104, as generally shown in FIG. 1A, at 130. The topology information may be used to characterize or otherwise represent information for a topological model of the instantiated network slice 120 as can be generated by the NSMF 112 based on management and orchestration operations involving instantiated network slice 120, which may be performed via NFVO 114 and VIM 118.

FIG. 1B illustrates example details regarding topology information 128 that may be provided to the slice consumer orchestrator 104. For example, in at least one embodiment as generally shown at 128-1, the topology information 128 may identify a list of network locations associated with the topology of instantiated network slice 120 that identifies each of multiple network locations of the instantiated network slice 120 at which consumer-defined workload(s) may be instantiated/provided for the slice consumer and may provide performance characteristics of slice resources as provided at each of the network locations, as generally shown at 128-2.

Network locations identified for the topology of instantiated network slice 120 can be provided using any format. For example, in some embodiments, a network location can be identified using a coordinate system, such as latitude and longitude (LAT/LON) coordinates, Global Positioning System (GPS) coordinates, or the like, as generally shown for a network Location 'A' (LOC (A)) corresponding to slice resources 122-1 and a network Location 'B' (LOC (B)) corresponding to slice resources 122-2 provided for instantiated network slice 120.

It is to be understood that other location information may be used to identify a location of slice resources. For example, in some embodiments, vRAN-based location identifiers may be utilized to indicate network locations. As shown in FIG. 1B, for example, a network Location 'Z' (LOC (Z)) can include coordinate-based location information in combination with vRAN-based location information, such as one or more Tracking Area Identities (TAI(s)), that may identify coverage area(s) of radio node(s) provided by vRAN 122, such as radio node 126. Any other mobile network/radio network identifiers, such as Public Land Mobile Network (PLMN) identifiers, Cell Global Identifiers (CGIs, including New Radio (NR) CGIs (NCGIs) and/or EUTRA CGIs (ECGIs)), Routing Area Identifiers (RAIs), and/or the like, and/or any other location identifiers, such as logical names, or the like may be utilized.

Performance characteristics of slice resources as provided at each of the network locations can also be provided using any format and may identify any combination of performance and/or slice resource capability characteristics that may be useful to characterize performance and/or capabilities of slice resources, services/VNFs/operations available at/associated with a given network location, vRAN performance associated with a given network location, and/or the like.

Figure 2A:
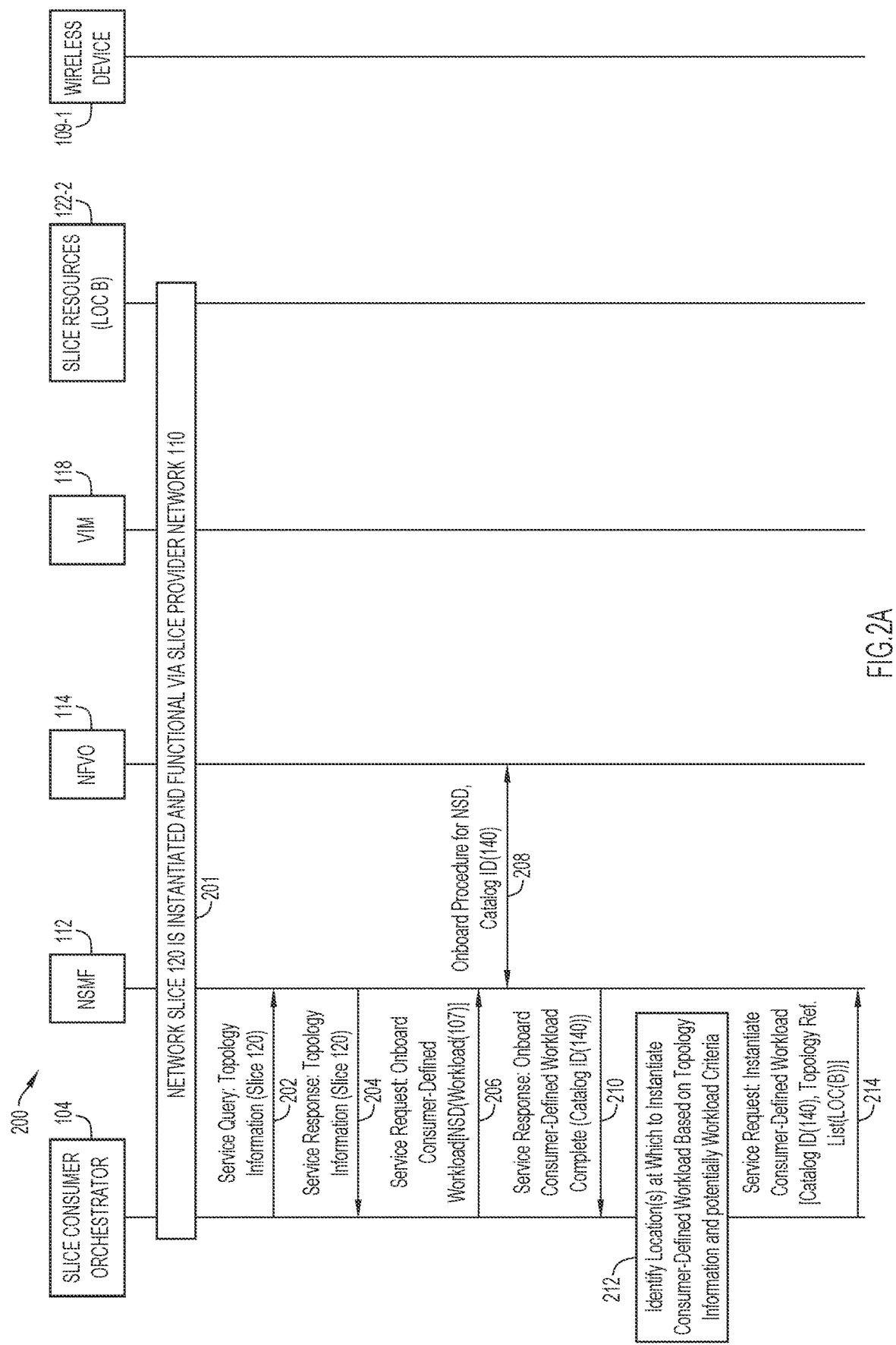
FIGS. 2A and 2B are a message sequence diagram illustrating various example operations that may be performed to facilitate instantiation of a consumer-defined workload for a network slice of a slice provider network, according to an example embodiment.
Figure 2B:
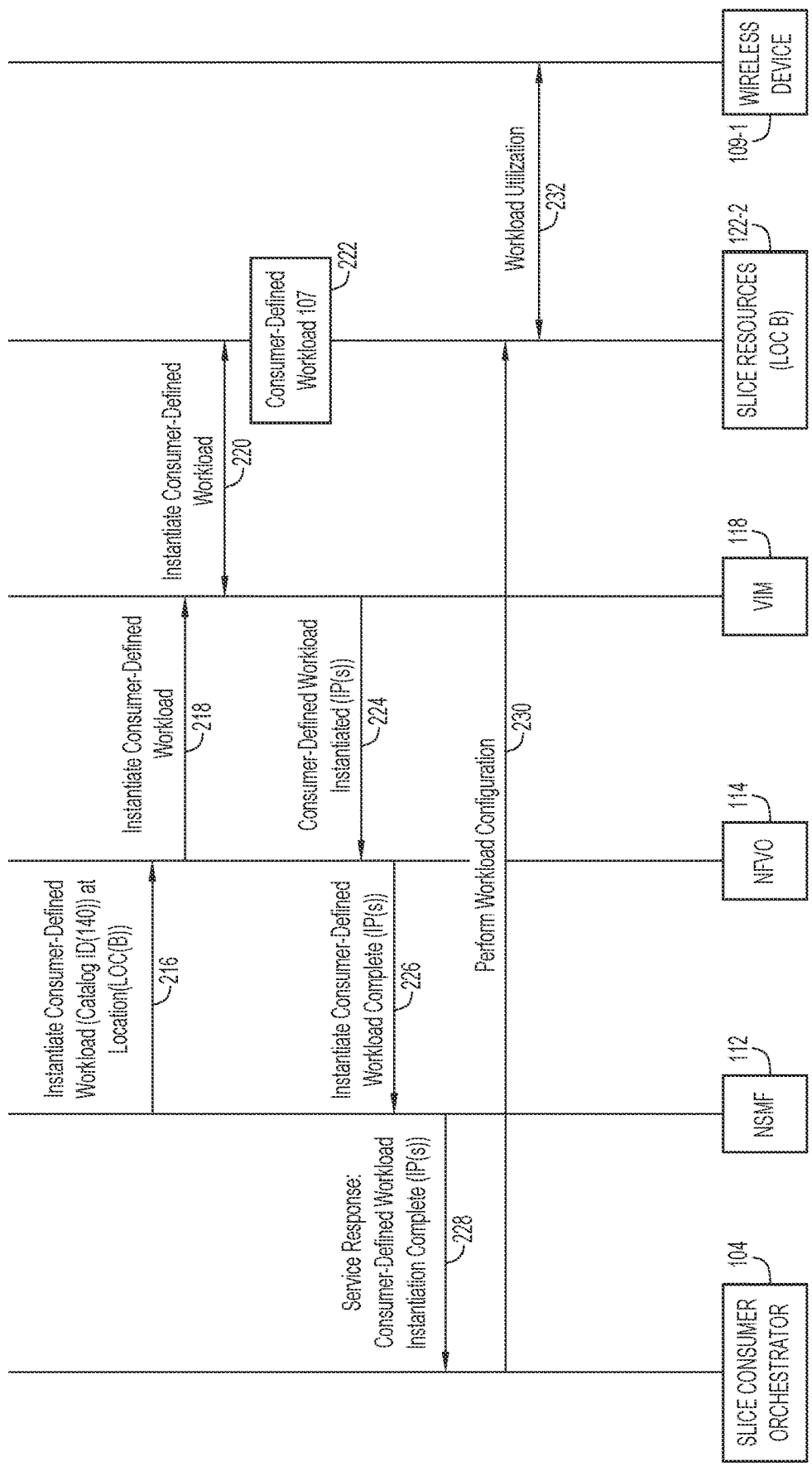

For example, as shown in FIG. 1B, in at least embodiment, performance characteristics including network timing information, such as network latency and jitter information can be provided for network Location 'A', in combination with capability characteristics indicating compute capabilities, such as an amount of random access memory (RAM) (e.g., 128 Gigabytes (GB)), network protocol capabilities supported/provided by slice resources 122-1 available at network Location 'A', and/or one or more VNF types provided at the network location (e.g., SMF, as shown in FIG. 2B, although it is to be understood that the VNF types may include any applicable VNF types, such as AMF, SMF (or combined AMF/SMF), PCF, UDM, etc. for a core network architecture (4G, 5G, etc.))

In some embodiments, performance characteristics including network timing information (e.g., latency and jitter) can be provided for network Location 'B', along with vRAN adjacency information indicating slice resources at the given network location interface directly with vRAN resources for Radio Access Technology (RAT) type(s) (e.g., 4G/LTE, 5G, etc.) and/or providing vRAN timing information, which can be used to indicate vRAN service capabilities available at/near and/or associated with the network location. Further, in some embodiments as shown for network Location 'B' any other potential capability information can be provided for network Location 'B'. For example, an indication that a location is Layer 2 (L2) adjacent to a virtual local area network (VLAN) may be identified in some cases. Any service capabilities (e.g., network services, content caching services, etc.) available at/near and/or associated with the network location may be identified via topology information. Further, capability characteristics may be provided for the slice resources 122-2 at network Location 'B' indicating compute capabilities (e.g., 128 GB), storage capabilities (e.g., 2 Terabytes (TB)), and network protocol capabilities supported/provided by slice resources 122-2 available at network Location 'B'. Further, capability characteristics indicating one or more VNF types provided at the network location (e.g., UPF, as shown in FIG. 2B) can be identified via performance characteristics provided for the network location. Any performance characteristics may also be provided for network Location 'Z' regarding slice resources 122-N, as shown in FIG. 2B.

It is to be understood that any other applicable performance characteristics may be included in topology information 128 provided to slice consumer orchestrator 104 in order to enable the orchestrator to identify one or more network location(s) of instantiated network slice 120 at which to instantiate one or more instance(s) of consumer-defined workload 107 in accordance with embodiments herein.

Based on the topology information 128 and, potentially based on workload criteria associated with the consumer-defined workload 107 (e.g., performance thresholds, such as latency/jitter thresholds of the workload, proximity/availability of vRAN resources for the workload, compute/storage/network criteria of the workload, operations to be executed/run by the workload, target wireless devices to be served, etc.), slice consumer orchestrator 104 can identify one or more network locations within instantiated network slice 120 at which the consumer-defined workload 107 is to be instantiated (e.g., potentially based on analysis/comparison of the workload criteria in relation to the performance characteristics of slice resources of each network location of the plurality of network locations). For instance, one example may involve a slice consumer, such as a multi-location business that is to utilize an industrial control loop to run locally at each of one or more locations. Another example may involve a slice consumer that is to utilize content caches that might be setup at several locations. Thus, there can be many different scenarios through which a slice consumer may seek to provide consumer-defined workloads at different locations.

As generally shown at 150, the slice consumer orchestrator 104 can request instantiation of one or more instances the consumer-defined workload 107 (as described by NSD 108) with reference to network location(s) in the slice topology for placement of the workload and the NFVO catalog ID, such as catalog ID (140) at Location 'B' (LOC (B)) in this example.

In some embodiments, a request may identify multiple network locations at which it might be desired to instantiate the consumer-defined workload in which the order of the network locations in the request corresponds to a ranking of the network locations (e.g., first location is most desirable, second location is next most desirable, etc.). In some embodiments, a ranking may be parametric, which may depend on the current metrics for different locations (e.g., RAN coverage, performance characteristics, etc.) In some embodiments, however, a request may identify multiple network locations such that the slice consumer desires the workload to be instantiated at each of the network locations identified in the request. In various embodiments, any format of Attribute-Value-Pair (AVP), Type-Length-Value (TLV) objects, flags, etc. may be utilized to indicate whether multiple network locations included in a request correspond to a ranked list of network locations at which it would be desirable to instantiate a workload or a request for instantiating a workload at each of multiple network locations.

Further, in some embodiments, a workload instantiation request sent from slice consumer orchestrator 104 to NSMF 112 may identify multiple workloads and multiple network locations (e.g., in a delineated list of workload: network location pairs, etc.) such that each of a correspond workload may be instantiated at each of one or more corresponding workloads.

Further, in still some embodiments, a workload instantiation request sent from slice consumer orchestrator 104 to NSMF may include additional configuration parameters, such as wireless device identifiers, access control list (ACL) information, service data flow (SDF) information, charging/billing information, API parameters, any parameters that may be considered/represent 'day0' parameters, and/or the like that may be utilized for one or more operations of a given consumer-defined workload, once instantiated at one or more network location(s).

Continuing with the present example, upon receiving the request to instantiate consumer-defined workload 107, the NSMF 112 requests the NFVO 114 for the instantiation of the workload, which is brought-up/instantiated in the network slice user space at the corresponding network location(s) via VIM 118, and returns reference(s), such as Internet Protocol (IP) address(es) and/or any other relevant identifying information, for the newly instantiated consumer-defined workload(s) 107 (e.g., multiple references if multiple workloads are instantiated at each of multiple network locations) to the slice consumer orchestrator 104.

Thereafter, the slice consumer orchestrator 104 may access and configure the consumer-defined workload 107 (or each of multiple instances of the workload, if applicable) and wireless devices 109-1 and 109-2 may perform operations that may utilize the workload for slice consumer application(s) 106.

Consider various other example details associated with operations that may be performed via system 100 to facilitate providing consumer-defined workload 107 at network location(s) of instantiated network slice 120, as discussed, with reference to FIGS. 2A and 2B, which are a message sequence diagram 200 illustrating various operations/communications that may be utilized to facilitate instantiation of the consumer-defined workload 107, according to an example embodiment.

FIGS. 2A and 2B include slice consumer orchestrator 104, NSMF 112, NFVO 114, VIM 118, slice resources 122-2 at network Location 'B' (for example only), and slice consumer wireless device 109-1 (for example only). For FIGS. 2A and 2B, it is assumed that network slice 120 is instantiated and functional via slice provider network 110, as generally illustrated at 201.

At 202, consider that slice consumer orchestrator 104 generates and transmits a service query message to NSMF 112 requesting topology information for slice 120. At 204, slice consumer orchestrator 104 obtains the topology information for instantiated network slice 120 (e.g., topology information 128, as discussed above for FIGS. 1A and 1B) via a service response message transmission received from NSMF 112 in which the NSMF 112 may gather, maintain, and/or generate the topology information based on management and orchestration operations involving instantiated network slice 120, which may be performed via NFVO 114 and VIM 118.

Thus, in accordance with embodiments herein, the slice consumer orchestrator 104 is to obtain a topological model of the instantiated network slice 120, as construed by the slice provider network 110 or, more specifically, by NSMF 112. Information characterizing and/or otherwise representing the topological model of the instantiated network slice 120 can be provided to the slice consumer orchestrator 104 via topology information 128 communicated from the NSMF 112 to the slice consumer orchestrator 104, as shown at 204.

At 206, consider that slice consumer orchestrator 104 sends a service request to NSMF 112 requesting onboarding of the consumer-defined workload 107 in which the request includes the NSD 108 characterizing/describing the consumer-defined workload 107. At 208, NSMF 112 performs an onboarding procedure (e.g., per ETSI standards) for the NSD 108 for the consumer-defined workload 107 in order to create/onboard the workload into the NS catalog 116 of NFVO 114 such that the workload is identified via catalog ID 140. For example, in some instances, the NSMF 112 can generate and expose a catalog ID. In some instances, a catalog ID generated/exposed by the NSMF 112 could, in turn translate into an NFVO 114 generated catalog ID. In still some instances, depending on implementation, for example, there could be multiple NFVOs, each with its own (local) catalog ID to which the NSMF 112 could translate based on the catalog ID generated by the NSMF 112. As shown at 210, slice consumer orchestrator 104 obtains a service response from the NSMF 112 indicating that the consumer-defined workload 107 is successfully onboarded to the slice provider network 110 and including the catalog ID 140 identifying the workload.

Thus, in accordance with embodiments herein, the slice consumer orchestrator 104 is to make available to slice provider network 110 a description of the consumer-defined workload 107 (or multiple workloads, etc.) that is desired to be run/operated/instantiated in the instantiated network slice 120. It is to be understood that operations 206, 208, and 210 may be performed asynchronously at any time (e.g., before requesting topology information from the NSMF 112). Further, it is to be understood that in some embodiments, the onboarding may be performed in multiple steps and/or potentially multiple communications among one or more of slice consumer orchestrator 104, NSMF 112, NFVO 114, and/or any other elements of system 100 based on the specifics of a given workload, workload type, operations to be executed for the workload, etc.

Moving to 212, consider that slice consumer orchestrator 104 identifies one or more network locations at which to instantiate the consumer-defined workload 107 based at least in part on the topology information obtained (128) at 204. In one example, the determination/identification of the one or more network locations performed by the slice consumer orchestrator 104 may be based on the network location information identified in the topology information and performance characteristics associated with each network location as identified in the topology information. In one example, the determination/identification at 212 may be based additionally on workload criteria associated with the consumer-defined workload 107 (e.g., performance thresholds, such as latency/jitter thresholds of the workload, proximity/availability of vRAN resources for the workload, compute/storage/network resource criteria of the workload, operations to be executed/run by the workload, target wireless devices to be served, etc.) that can be analyzed/compared in relation to the performance characteristics of slice resources of each network location of the plurality of network locations in order to identify the one or more network locations at which to instantiate the consumer-defined workload 107. For example, the identification may involve identifying location(s) at which content is to be cached (e.g., based on content caching workload criteria), locations at which control operations are to be performed (e.g., based on industrial control loop workload criteria), and/or any other workload criteria that may be applicable for identifying corresponding network location(s) at which to instantiate consumer-defined workloads.

For the example of FIGS. 2A and 2B, consider that the slice consumer orchestrator 104 identifies network Location 'B' associated with slice resources 122-2 at which an instance of the consumer-defined workload 107 is to be instantiated.

Upon identifying the one or more network locations at which to instantiate the consumer-defined workload 107, the slice consumer orchestrator 104 requests instantiation of one or more instances of the consumer-defined workload 107 (e.g., the NSD 108 defining the workload 107) by generating and transmitting a service request message to the NSMF 112 that includes reference(s) to the network locations(s) in the instantiated network slice 120 topology at which the consumer-defined workload 107 is to be instantiated and includes the catalog ID 140 identifying the workload to the NSMF 112/NFVO 114 in the service request message.

For the example of FIGS. 2A and 2B, as shown at 214, consider that the service request message sent by slice consumer orchestrator 104 includes a location identifier indicating network Location 'B' within a topology location reference list and a workload identifier indicating catalog ID 140 for the consumer-defined workload 107 (e.g., the NSD 108 defining the workload 107).

Thus, in accordance with embodiments herein, the slice consumer orchestrator 104 can specify to the slice provider or, more specifically, to NSMF 112 where in the instantiated network slice 120 (e.g., at a particular network location or at multiple network locations, based on the topological model/topology information 128) that the consumer-defined workload 107 is to be instantiated (e.g., via any of slice resources 122-1-122-N) for the instantiated network slice 120.

Continuing to FIG. 2B, as shown at 216, the NSMF 112 sends a request to the NFVO to instantiate the consumer-defined workload 107 at the network Location 'B', which triggers the NFVO 114 to communicate a request to the VIM 118, as shown at 218 to perform the instantiation of the workload. As shown at 220, the VIM performs instantiation of the consumer-defined workload 107 via the slice resources 122-2 at network Location 'B', as illustrated at 222. Instantiation of the consumer-defined workload 107 at the slice resources 122-2 based on the NSD 108 defining the consumer-defined workload can be performed in accordance with ETSI/3GPP standards-defined procedures/operations.

Once instantiated, an IP address and/or any other identifying information (e.g., port number, subnet, etc.) that may be used for accessing, managing, configuring, etc. the instance of the consumer-defined workload 107 can be provided by the VIM 118 to the NFVO 114, as shown at 224. The IP address and/or other identifying information for the instantiated consumer-defined workload 107 can be included in a message sent from the NFVO 114 to the NSMF 112, as shown at 226, indicating that instantiation of the consumer-defined workload 107 at the specified network location has been completed. The NSMF 112 can provide the IP address and/or other identifying information for the consumer-defined workload 107 to the slice consumer orchestrator 104, as shown at 228, indicating that instantiation of the consumer-defined workload 107 at the specified network location has been completed.

Thereafter, as shown at 230, the slice consumer orchestrator 104 may, using the IP address and/or other identifying information, perform one of more configuration operations/procedures in order to configure one or more features of the consumer-defined workload 107 instantiated at network Location 'B' of the instantiated network slice 120. As shown at 232, the wireless device 109-1 may utilize the consumer-defined workload 107 instantiated via the slice resources 122-2, for example, for communications, operations, etc. involving slice consumer application(s) 106 (not shown in FIGS. 2A and 2B). The configuration operations/procedures performed by the slice consumer orchestrator may depend on the type of workload that is to be instantiated for a location, such as software specific configurations based on role, geography, etc. As an example, for a content caching consumer-defined workload, such configuration operations/procedures could involve configuring parameters of a content cache (e.g., size, retention time, type of content, etc.).

Thus, in accordance with embodiments herein, techniques are provided through which a slice consumer (e.g., slice consumer orchestrator 104) may direct or request a consumer-defined workload to be instantiated at one or more network locations of an instantiated network slice, based on topology information (e.g., network location information and performance characteristics) of the instantiated network slice provided to the slice consumer and various criteria associated with the workload.

Such may allow (5G) slice network providers to offer true cloud infrastructure-like services to slice consumers by enabling slice consumers to run/operate consumer-defined workloads (i.e., as specified/customized/defined by slice consumers) in one or more network locations as specified by the slice consumers, within the context of instantiated network slices provided by slice network providers. Such techniques may allow a slice consumer to cater to the criteria of their own network elements (e.g., IoT controllers, DNS servers, custom content caches, etc.) through utilization of slice resources of an instantiated network slice provided by slice provider network and may provide revenue potential for slice providers.

Figure 3:
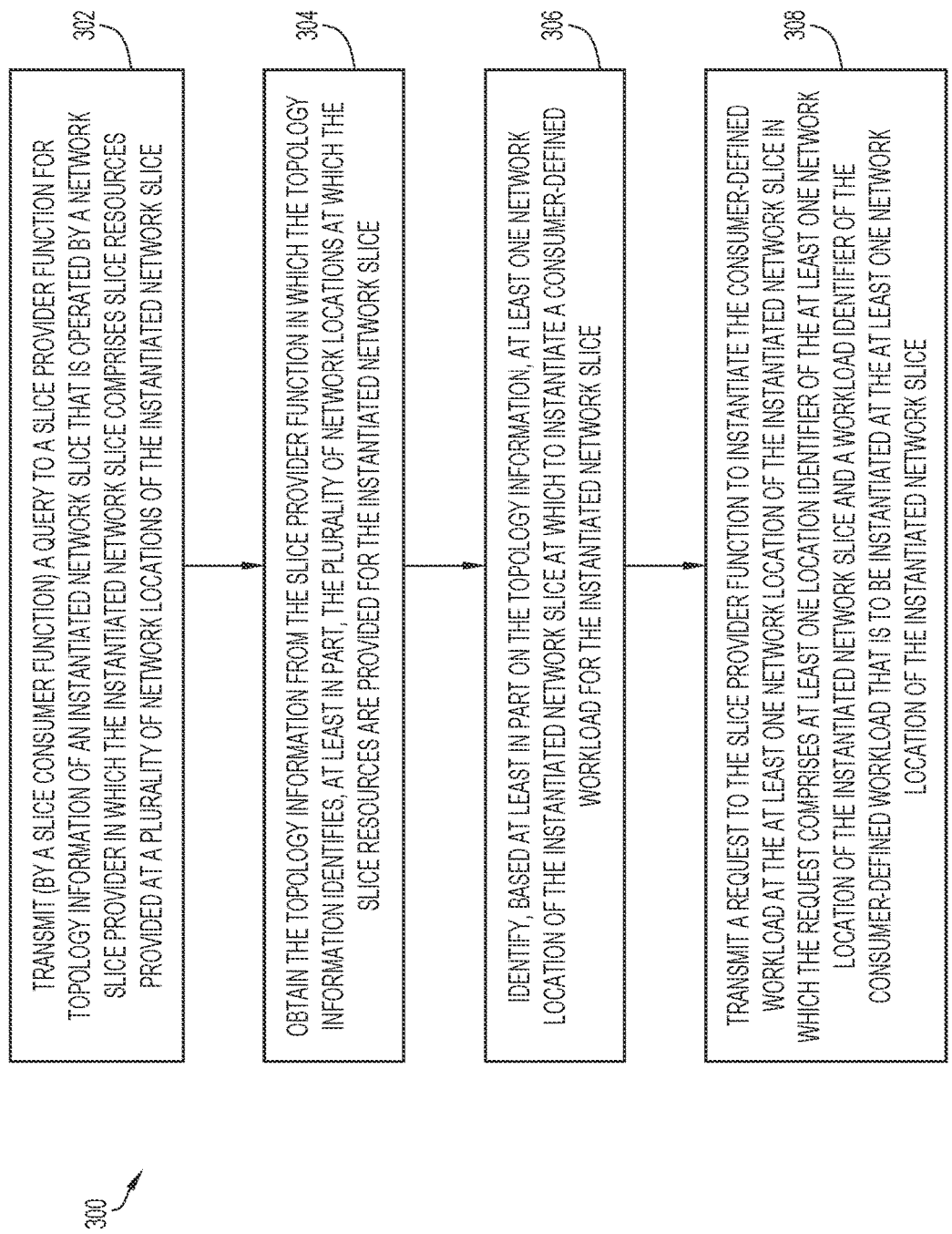
FIG. 3 is a flow chart depicting a method according to an example embodiment.

Referring to FIG. 3, FIG. 3 is a flow chart depicting a method 300 according to an example embodiment. In at least one embodiment, method 300 may be a computer-implemented method that is associated with operations that may be performed to facilitate providing a consumer-defined workload at one or more network locations of an instantiated network slice of a slice provider network, according to an example embodiment. In at least one embodiment, method 300 may be performed by slice consumer function, such as slice consumer orchestrator 104 as shown in FIGS. 1A, 2A, and 2B.

At 302, the method may include (the slice consumer function) transmitting a query to a slice provider function (e.g., NSMF 112) for topology information of an instantiated network slice that is operated by a network slice provider in which the instantiated network slice comprises slice resources provided at a plurality of network locations of the instantiated network slice.

At 304, the method may include obtaining the topology information from the slice provider function in which the topology information identifies, at least in part, the plurality of network locations at which the slice resources are provided for the instantiated network slice. The topology information may further identify performance characteristics associated with slice resources provided at each of the plurality of network locations of the instantiated network slice.

In some embodiments, the performance characteristics may include timing information/characteristics (e.g., network latency, jitter, etc.) for slice resources at one or more network locations of the plurality of network locations of the instantiated network slice. In some embodiments, the performance characteristics may identify one or more of: compute capabilities associated with slice resources at one or more network locations of the plurality of network locations of the instantiated network slice; storage capabilities associated with slice resources at one or more network locations of the plurality of network locations of the instantiated network slice; or network capabilities associated with slice resources at one or more network locations of the plurality of network locations of the instantiated network slice.

In some embodiments, the performance characteristics may identify one or more of: adjacency information indicating virtualized Radio Access Network (vRAN) services associated with slice resources at one or more network locations of the plurality of network locations of the instantiated network slice; adjacency information indicating service capabilities associated slice resources at one or more network locations of the plurality of network locations of the instantiated network slice; or one or more virtualized network function types provided via slice resources at one or more network locations of the plurality of network locations of the instantiated network slice.

At 306, the method may include identifying, based at least in part on the topology information, at least one network location of the instantiated network slice at which to instantiate a consumer-defined workload for the instantiated network slice. In some embodiments, the identifying may be based additionally on workload criteria associated with the consumer-defined workload (e.g., latency/jitter thresholds of the workload, proximity/availability of vRAN resources for the workload, compute/storage/network criteria of the workload, etc.) that can be analyzed/compared in relation to the performance characteristics of slice resources of each network location of the plurality of network locations.

At 308, the method may include transmitting a request to the slice provider function to instantiate the consumer-defined workload at the at least one network location of the instantiated network slice in which the request comprises at least one location identifier of the at least one network location of the instantiated network slice and a workload identifier of the consumer-defined workload that is to be instantiated at the at least one network location of the instantiated network slice.

Although not shown in FIG. 3, the method may further include obtaining a response to the request to initiate the consumer-defined workload at the at least one network location of the instantiated network slice in which the response comprises an IP address for the consumer-defined workload that is instantiated at the at least one network location of the instantiated network slice, which may enable the slice consumer function to configure and/or otherwise manage the consumer-defined workload that is instantiated at the at least one network location.

Figure 4:
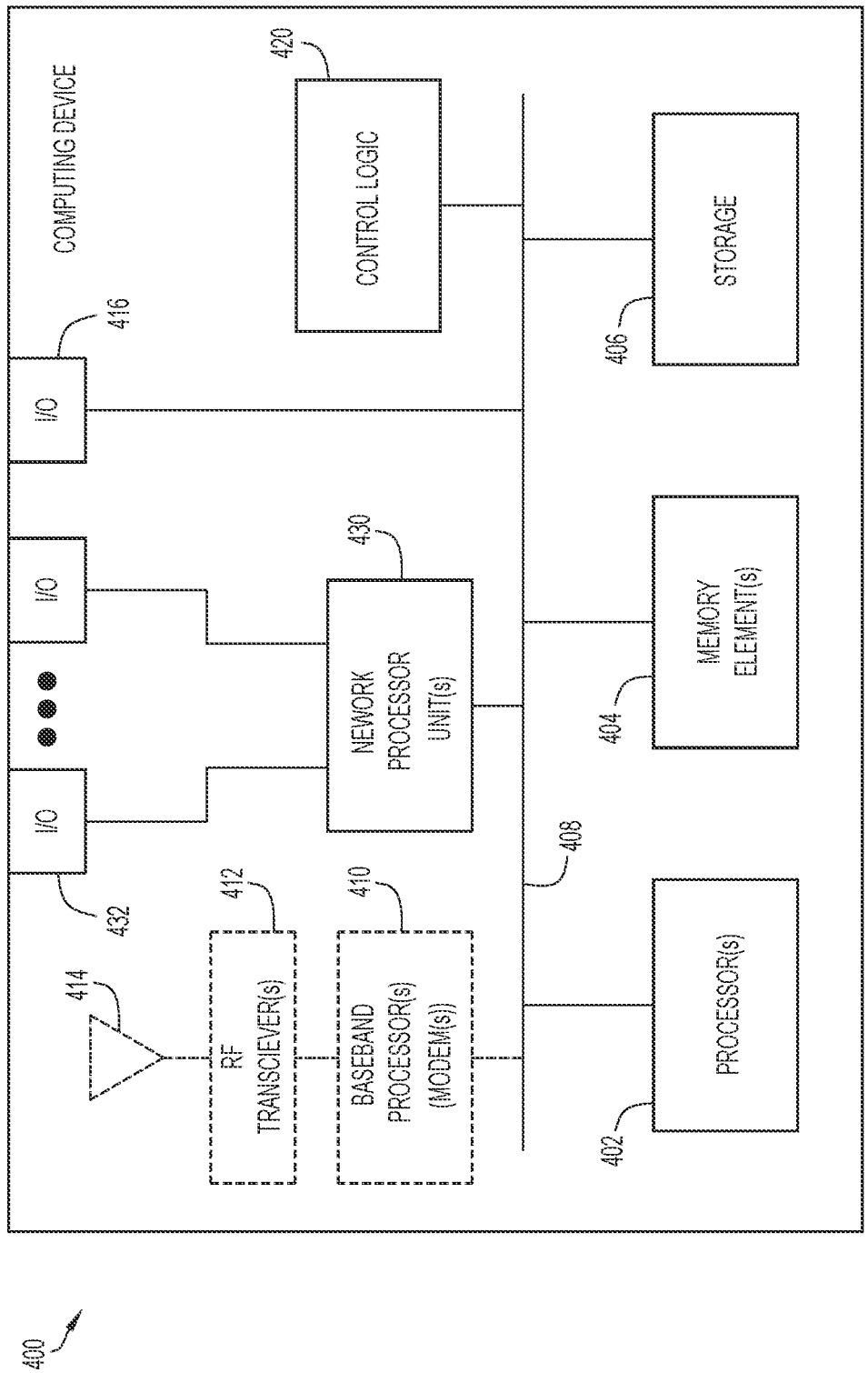
FIG. 4 illustrates a hardware block diagram of a computing device configured to perform functions associated with operations discussed in connection with embodiments herein.

Referring to FIG. 4, FIG. 4 illustrates a hardware block diagram of a computing device 400 that may perform functions associated with operations discussed herein in connection with the techniques described for embodiments herein. In various embodiments, a computing device or apparatus, such as computing device 400 or any combination of computing devices 400, may be configured as any entity/entities in order to perform operations of the various techniques discussed for embodiments herein.

In at least one embodiment, the computing device 400 may be any apparatus that may include one or more processor(s) 402, one or more memory element(s) 404, storage 406, a bus 408, one or more network processor unit(s) 430 interconnected with one or more network input/output (I/O) interface(s) 432, one or more I/O interface(s) 416, and control logic 420. In various embodiments, instructions associated with logic for computing device 400 can overlap in any manner and are not limited to the specific allocation of instructions and/or operations described herein.

For embodiments in which computing device 400 may be implemented as any device capable of wireless communications, computing device 400 may further include at least one baseband processor or modem 410, one or more radio RF transceiver(s) 412 (e.g., any combination of RF receiver(s) and RF transmitter(s)), one or more antenna(s) or antenna array(s) 414.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa) or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 430 may enable communication between computing device 400 and other systems, entities, etc., via network I/O interface(s) 432 (wired and/or wireless) to facilitate operations discussed for various embodiments described herein. In various embodiments, network processor unit(s) 430 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 432 can be configured as one or more Ethernet port(s), Fibre Channel ports, any other I/O port(s), and/or antenna(s)/antenna array(s) now known or hereafter developed. Thus, the network processor unit(s) 430 and/or network I/O interface(s) 432 may include suitable interfaces for receiving, transmitting, and/or otherwise communicating data and/or information (wired and/or wirelessly) in a network environment.

I/O interface(s) 416 allow for input and output of data and/or information with other entities that may be connected to computing device 400. For example, I/O interface(s) 416 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 400 is implemented as a wireless device or any apparatus capable of wireless communications, the RF transceiver(s) 412 may perform RF transmission and RF reception of wireless signals via antenna(s)/antenna array(s) 414, and the baseband processor or modem 410 performs baseband modulation and demodulation, etc. associated with such signals to enable wireless communications for computing device 400.

In various embodiments, control logic 420 can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory element(s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include transmitting a query to a slice provider function for topology information of an instantiated network slice that is operated by a network slice provider, wherein the instantiated network slice comprises slice resources provided at a plurality of network locations of the instantiated network slice; obtaining the topology information from the slice provider function, wherein the topology information identifies, at least in part, the plurality of network locations at which the slice resources are provided for the instantiated network slice; identifying, based at least in part on the topology information, at least one network location of the instantiated network slice at which to instantiate a consumer-defined workload for the instantiated network slice; and transmitting a request to the slice provider function to instantiate the consumer-defined workload at the at least one network location of the instantiated network slice, wherein the request comprises at least one location identifier of the at least one network location of the instantiated network slice and a workload identifier of the consumer-defined workload that is to be instantiated at the at least one network location of the instantiated network slice.

In at least one instance, the computer-implemented method may further include obtaining a response to the request to initiate the consumer-defined workload at the at least one network location of the instantiated network slice, wherein the response comprises at least one Internet Protocol (IP) address for the consumer-defined workload that is instantiated at the at least one network location of the instantiated network slice.

In at least one instance, the computer-implemented method may further include transmitting a network service descriptor (NSD) to the slice provider function that describes the consumer-defined workload; and obtaining the workload identifier of the consumer-defined workload from the slice provider function.

In various instances, the slice resources comprise one or more of: compute resources; storage resources; network resources; radio access network resources; or one or more virtualized network functions.

In at least one instance, the topology information further identifies performance characteristics associated with slice resources provided at each of the plurality of network locations of the instantiated network slice.

In at least one instance, the performance characteristics identify timing information for slice resources at one or more network locations of the plurality of network locations of the instantiated network slice.

In various instances, the performance characteristics identify one or more of: compute capabilities associated with slice resources at one or more network locations of the plurality of network locations of the instantiated network slice; storage capabilities associated with slice resources at one or more network locations of the plurality of network locations of the instantiated network slice; or network capabilities associated with slice resources at one or more network locations of the plurality of network locations of the instantiated network slice.

In various instances, the performance characteristics identify one or more of: adjacency information indicating virtualized Radio Access Network (vRAN) services associated with slice resources at one or more network locations of the plurality of network locations of the instantiated network slice; adjacency information indicating service capabilities associated slice resources at one or more network locations of the plurality of network locations of the instantiated network slice; or one or more virtualized network function types provided via slice resources at one or more network locations of the plurality of network locations of the instantiated network slice.

Variations and Implementations

Generally, per-3GPP standards for a mobile core network, such as may be implemented via instantiated network slice 120 as shown in FIG. 1A in some embodiments, an AMF interfaces with an SMF which can further interface with one or more UPFs. An AMF and an SMF can further interface with a PCF, a Network Repository Function (NRF), a UDM/UDR, and various other core network functions via 3GPP Service-Based Interface (SBI) constructs/interfaces. An AMF and a UPF can further interface with a RAN node, such as one or more gNBs (e.g., radio node 126) or disaggregated components thereof (e.g., a CU).

One or more wireless device sessions, often referred to as Protocol Data Unit (PDU) sessions can be established between a wireless device and a UPF for a core network in which the session may be facilitated/managed by an SMF, as is generally understood in the art.

Generally, a radio access may include one or more radio access network (RAN) radio nodes that may implement a wireless wide area (WWA) (e.g., cellular) air interface and, in some instances also a wireless local area (WLA) (e.g., Wi-Fi®) air interface, for any combination of Radio Access Technology (RAT) types (e.g., 'accesses'), such as 3GPP WWA licensed spectrum accesses (e.g., Fourth Generation/ Long Term Evolution (4G/LTE), 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP licensed/unlicensed spectrum wireless local area (WLA) accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/ or the like.

Thus, a WWAN RAN radio node may be inclusive of any configuration/combination of 3GPP 4G/LTE evolved Node Bs (eNBs or eNodeBs), 5G next Generation Node Bs (gNBs or gNodeBs), and/or any other next Generation access nodes that may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G, nG, CBRS, etc.) through which one or more wireless devices (e.g., wireless devices 109-1 and 109-2), may utilize to connect for one or more sessions (e.g., voice/IMS, data/internet (e.g., video, gaming, etc.), combinations thereof, etc.).

In some instances, a radio node, such as a Wi-Fi AP (e.g., a WLAN radio node/WLC implemented for radio node 126, in at least one embodiment), may implement a WLA area interface alone in order to provide facilitate WLAN accesses (e.g., 802.11, including any variation thereof, such as 802.11a, 802.11b, 802.11 g, 802.11ac (Wi-Fi 5), 802.11ax (Wi-Fi 6/6E), 802.11be (Wi-Fi 7), and/or any future variation that may be implemented). Such a WLAN radio node/ WLC may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air RF coverage for one or more WLAN access types through which one or more wireless devices (e.g., wireless devices 109-1 and 109-2), may utilize to connect for one or more sessions (e.g., voice/IMS, data/internet (e.g., video, gaming, etc.), combinations thereof, etc.).

A wireless device, such as wireless devices 109-1 and 109-2, or any other wireless devices discussed herein, may be considered any electronic device, etc. that initiates a connection or communication session with a corresponding core network, and may be inclusive of but not limited to a computer, a mobile phone or mobile communication device, an electronic tablet, a laptop, etc. an electronic device such as an industrial device (e.g., a robot), automation device, enterprise device, appliance, Internet of Things (IoT) device, a router with a WWA/WLA interface, a WWA/WLA (cellular/Wi-Fi®) enabled device. and/or any other device, component, element, or object capable of initiating voice, audio, video, media, or data exchanges within a system. Thus, a wireless device may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to connect to one or more radio nodes of one or more RAN(s).

Generally, an AMF may facilitate access and mobility management control/services for one or more wireless devices seeking connection to/connected to a mobile core network. Generally, an SMF may be responsible for wireless device session management, with individual functions/services being supported on a per-session basis in order to facilitate data transfer(s) between a wireless device and one or more networks via one or more UPFs. Generally, a UPF may operate to provide packet routing and forwarding operations for user data traffic and may also perform a variety of functions such as packet inspection, traffic optimization, Quality of Service (QoS), policy enforcement and user data traffic handling (e.g., to/from one or more data networks), billing operations (e.g., accounting, etc.), among other operations, for wireless device sessions. Typically, a UDM stores subscription data (typically in combination with a Unified Data Repository (UDR)) for subscribers (e.g., a user that may be associated with a given wireless device) that can be retrieved and/or otherwise obtained/utilized during operation of a core network system. Typically, an NRF provides support for network function (NF) management (e.g., registering, deregistering, updating services to NFs/NF services), NF discovery (e.g., enabling NF service consumer(s) to discover a set of NF instances with a specific NF service/NF type and/or to discover a specific NF service), and NF access (e.g., NF authorization), among others as provided via 3GPP standards.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method performed by a slice consumer function of a slice consumer network of an enterprise entity, comprising:

transmitting, by the slice consumer function of the slice consumer network of an enterprise entity, a query message to a slice provider function of a slice provider network to request topology information for an instantiated mobile network slice that is operating via the slice provider network operated by a network slice provider, wherein the instantiated mobile network slice comprises slice resources provided at a plurality of network locations of the instantiated mobile network slice that is operating via the slice provider network;

obtaining, by the slice consumer function of the slice consumer network of the enterprise entity, based on the query message, a response message from the slice provider function of the slice provider network that includes the topology information from the slice provider function, wherein the topology information identifies the plurality of network locations at which the slice resources are provided for the instantiated mobile network slice and identifies performance characteristics associated with the slice resources provided at each of the plurality of network locations of the instantiated mobile network slice;

identifying, by the slice consumer function of the slice consumer network of the enterprise entity, at least one network location of the instantiated mobile network slice at which to request instantiation of a consumer-defined workload for the instantiated mobile network slice, based on the topology information including the performance characteristics included in the response message in comparison to one or more workload criteria indicating performance thresholds of the consumer-defined workload; and transmitting, by the slice consumer function of the slice consumer network of the enterprise entity, a request message to the slice provider function of the slice provider network requesting the slice provider function to instantiate the consumer-defined workload at the at least one network location of the instantiated mobile network slice, wherein the request message comprises at least one location identifier of the at least one network location of the instantiated mobile network slice and a workload identifier of the consumer-defined workload that is to be instantiated at the at least one network location of the instantiated mobile network slice and wherein the at least one location identifier of the at least one network location is a plurality of network location identifiers indicating a ranking of a plurality of particular network locations at which the consumer-defined workload is requested to be instantiated in which the ranking is parametric based on the performance characteristics associated with the slice resources provided at each of the plurality of network locations of the instantiated mobile network slice and the slice provider function of the slice provider network is to instantiate the consumer-defined workload at least at a highest ranked network location of the ranking.

2. The computer-implemented method of claim 1, further comprising:

obtaining, by the slice consumer function of the slice consumer network of the enterprise entity, a response message from the slice provider function of the slice provider network, wherein the response message comprises at least one Internet Protocol (IP) address for the consumer-defined workload that is instantiated at the at least one network location of the instantiated mobile network slice.

3. The computer-implemented method of claim 2, further comprising:
configuring, by the slice consumer function of the slice consumer network of the enterprise entity, the consumer-defined workload that is instantiated at the at least one network location of the instantiated mobile network slice using the at least one IP address for the consumer-defined workload that is included in the response message obtained from the slice provider function of the slice provider network.

4. The computer-implemented method of claim 1, further comprising:
transmitting, by the slice consumer function of the slice consumer network of the enterprise entity, a network service descriptor (NSD) to the slice provider function of the slice provider network that describes the consumer-defined workload; and
obtaining, by the slice consumer function of the slice consumer network, the workload identifier of the consumer-defined workload from the slice provider function of the slice provider network.

5. The computer-implemented method of claim 1, wherein the slice resources comprise one or more of:
compute resources;
storage resources;
network resources;
radio access network resources; or
one or more virtualized network functions.

6. The computer-implemented method of claim 1, wherein the performance characteristics identify one or more of:
adjacency information indicating virtualized Radio Access Network (vRAN) services associated with slice resources at one or more network locations of the plurality of network locations of the instantiated mobile network slice;
adjacency information indicating service capabilities associated with slice resources at one or more network locations of the plurality of network locations of the instantiated mobile network slice; or
one or more virtualized network function types provided via slice resources at one or more network locations of the plurality of network locations of the instantiated mobile network slice.

7. The computer-implemented method of claim 1, wherein the performance characteristics identify one or more of:
timing information for slice resources at one or more network locations of the plurality of network locations of the instantiated mobile network slice;
compute capabilities associated with slice resources at one or more network locations of the plurality of network locations of the instantiated mobile network slice;
storage capabilities associated with slice resources at one or more network locations of the plurality of network locations of the instantiated mobile network slice; or
network capabilities associated with slice resources at one or more network locations of the plurality of network locations of the instantiated mobile network slice.

8. The computer-implemented method of claim 1, wherein the topology information included in the response message obtained by the slice consumer function of the slice consumer network of the enterprise entity further includes virtualized Radio Access Network (vRAN) information indicating one or more coverage areas of one or more radio nodes associated with the slice resources provided at each of the plurality of network locations of the instantiated mobile network slice.

9. The computer-implemented method of claim 8, wherein the vRAN information includes one or more Tracking Area Identities that identify the one or more coverage areas of the one or more radio nodes.

10. One or more non-transitory computer readable storage media for a slice consumer function of a slice consumer network of an enterprise entity, the media encoded with instructions that, when executed by a processor, cause the processor to perform operations, comprising:
transmitting, by the slice consumer function of the slice consumer network of the enterprise entity, a query message to a slice provider function of a slice provider network to request topology information for an instantiated mobile network slice that is operating via the slice provider network operated by a network slice provider, wherein the instantiated mobile network slice comprises slice resources provided at a plurality of network locations of the instantiated mobile network slice that is operating via the slice provider network;
obtaining, by the slice consumer function of the slice consumer network of the enterprise entity, based on the query message, a response message from the slice provider function of the slice provider network that includes the topology information from the slice provider function, wherein the topology information identifies the plurality of network locations at which the slice resources are provided for the instantiated mobile network slice and identifies performance characteristics associated with the slice resources provided at each of the plurality of network locations of the instantiated mobile network slice;
identifying, by the slice consumer function of the slice consumer network of the enterprise entity, at least one network location of the instantiated mobile network slice at which to request instantiation of a consumer-defined workload for the instantiated mobile network slice, based on the topology information including the performance characteristics included in the response message in comparison to one or more workload criteria indicating performance thresholds of the consumer-defined workload; and
transmitting, by the slice consumer function of the slice consumer network of the enterprise entity, a request message to the slice provider function to instantiate the consumer-defined workload at the at least one network location of the instantiated mobile network slice, wherein the request message comprises at least one location identifier of the at least one network location of the instantiated mobile network slice and a workload identifier of the consumer-defined workload that is to be instantiated at the at least one network location of the instantiated mobile network slice and wherein the at least one location identifier of the at least one network location is a plurality of network location identifiers indicating a ranking of a plurality of particular network locations at which the consumer-defined workload is requested to be instantiated in which the ranking is parametric based on the performance characteristics associated with the slice resources provided at each of the plurality of network locations of the instantiated mobile network slice and the slice provider function of the slice provider network is to instantiate the consumer-defined workload at least at a highest ranked network location of the ranking.

11. The media of claim 10, further comprising instructions that, when executed by the processor, cause the processor to perform further operations, comprising:
obtaining, by the slice consumer function of the slice consumer network of the enterprise entity, a response message from the slice provider function of the slice provider network, wherein the response message comprises at least one Internet Protocol (IP) address for the consumer-defined workload that is instantiated at the at least one network location of the instantiated mobile network slice.

12. The media of claim 10, further comprising instructions that, when executed by the processor, cause the processor to perform further operations, comprising:
transmitting, by the slice consumer function of the slice consumer network of the enterprise entity, a network service descriptor (NSD) to the slice provider function of the slice provider network that describes the consumer-defined workload; and
obtaining, by the slice consumer function of the slice consumer network of the enterprise entity, the workload identifier of the consumer-defined workload from the slice provider function of the slice provider network.

13. The media of claim 10, wherein the performance characteristics identify one or more of:
adjacency information indicating virtualized Radio Access Network (vRAN) services associated with slice resources at one or more network locations of the plurality of network locations of the instantiated mobile network slice;
adjacency information indicating service capabilities associated slice resources at one or more network locations of the plurality of network locations of the instantiated mobile network slice; or
one or more virtualized network function types provided via slice resources at one or more network locations of the plurality of network locations of the instantiated mobile network slice.

14. The media of claim 10, wherein the at least one location identifier of the at least one network location included in the request message is a plurality of network location identifiers indicating a plurality of particular network locations at which the consumer-defined workload identified by the workload identifier is to be instantiated.

15. The media of claim 10, wherein the performance characteristics identify one or more of:
timing information for slice resources at one or more network locations of the plurality of network locations of the instantiated mobile network slice;
compute capabilities associated with slice resources at one or more network locations of the plurality of network locations of the instantiated mobile network slice;
storage capabilities associated with slice resources at one or more network locations of the plurality of network locations of the instantiated mobile network slice; or
network capabilities associated with slice resources at one or more network locations of the plurality of network locations of the instantiated mobile network slice.

16. The media of claim 10, wherein the slice resources comprise one or more of:
compute resources;
storage resources;
network resources;
radio access network resources; or
one or more virtualized network functions.

17. An apparatus, comprising:
at least one memory element for storing data; and
at least one processor for executing instructions associated with the data, wherein executing the instructions causes the apparatus to perform operations as a slice consumer function of a slice consumer network of an enterprise entity, the operations comprising:
transmitting, by the slice consumer function of the slice consumer network of the enterprise entity, a query message to a slice provider function of a slice provider network to request topology information for an instantiated mobile network slice that is operating via the slice provider network operated by a network slice provider, wherein the instantiated mobile network slice comprises slice resources provided at a plurality of network locations of the instantiated mobile network slice that is operating via the slice provider network;
obtaining, by the slice consumer function of the slice consumer network of the enterprise entity, based on the query message, a response message from the slice provider function of the slice provider network that includes the topology information from the slice provider function, wherein the topology information identifies the plurality of network locations at which the slice resources are provided for the instantiated mobile network slice and identifies performance characteristics associated with the slice resources provided at each of the plurality of network locations of the instantiated mobile network slice;
identifying, by the slice consumer function of the slice consumer network of the enterprise entity, at least one network location of the instantiated mobile network slice at which to request instantiation of a consumer-defined workload for the instantiated mobile network slice, based on the topology information including the performance characteristics included in the response message in comparison to one or more workload criteria indicating performance thresholds of the consumer-defined workload; and
transmitting, by the slice consumer function of the slice consumer network of the enterprise entity, a request message to the slice provider function of the slice provider network requesting the slice provider function to instantiate the consumer-defined workload at the at least one network location of the instantiated mobile network slice, wherein the request message comprises at least one location identifier of the at least one network location of the instantiated mobile network slice and a workload identifier of the consumer-defined workload that is to be instantiated at the at least one network location of the instantiated mobile network slice and wherein the at least one location identifier of the at least one network location is a plurality of network location identifiers indicating a ranking of a plurality of particular network locations at which the consumer-defined workload is requested to be instantiated in which the ranking is parametric based on the performance characteristics associated with the slice resources provided at each of the plurality of network locations of the instantiated mobile network slice, and the slice provider function of the slice provider network is to instantiate the consumer-defined workload at least at a highest ranked network location of the ranking.

18. The apparatus of claim 17, wherein executing the instructions causes the apparatus to perform further operations as the slice consumer function of the slice consumer network, the operations comprising:

obtaining, by the slice consumer function of the slice consumer network of the enterprise entity, a response message from the slice provider function of the slice provider network, wherein the response message comprises at least one Internet Protocol (IP) address for the consumer-defined workload that is instantiated at the at least one network location of the instantiated mobile network slice.

19. The apparatus of claim 17, wherein executing the instructions causes the slice consumer function to perform further operations as the slice consumer function of the slice consumer network, comprising:

transmitting, by the slice consumer function of the slice consumer network of the enterprise entity, a network service descriptor (NSD) to the slice provider function that describes the consumer-defined workload; and obtaining, by the slice consumer function of the slice consumer network of the enterprise entity, the workload identifier of the consumer-defined workload from the slice provider function of the slice provider network.

20. The apparatus of claim 17, wherein the performance characteristics identify one or more of:

timing information for slice resources at one or more network locations of the plurality of network locations of the instantiated mobile network slice;

compute capabilities associated with slice resources at one or more network locations of the plurality of network locations of the instantiated mobile network slice;

storage capabilities associated with slice resources at one or more network locations of the plurality of network locations of the instantiated mobile network slice; or network capabilities associated with slice resources at one or more network locations of the plurality of network locations of the instantiated mobile network slice.

\* \* \* \* \*